Patented Oct. 29, 1940

2,219,469

UNITED STATES PATENT OFFICE 2,219,469

PRESERVATION OF LATEX

Wallace Ellwood Cake and Eugene Miller McColm, Boenoet, Asahan, Sumatra, Dutch East Indies, assignors, by mesne assignments, to United States Rubber Company, New York, N. Y., a corporation of New Jersey No Drawing. Application November 16, 1937, Serial No. 174,764

6 Claims. (Cl. 260—820)

This invention relates to improvements in methods of preserving latex and the products thereof.

Latex is commonly preserved today with from 1 to 1.25% ammonia. The ammonia in such latex functions both as the basic material for rendering the latex alkaline to the proper degree, and also as a germicidal agent for preventing bacterial growth and the consequent development of acid in the latex which would result in coagulation. While ammonia is a satisfactory base for producing the desired alkalinity, its germicidal properties are so feeble that, if it is to act also as the germicidal agent, it must be used in concentrations greatly in excess of those necessary to otherwise merely obtain a satisfactory alkalinity.

The present invention relates to the preservation of latex with smaller amounts of ammonia than generally used in latex preservation procedures where ammonia is the sole preservative.

In carrying out the present invention, latex is preserved against putrefaction and coagulation by the addition thereto of small amounts of arsenic trioxide, in combination with ammonia or other base. The arsenic trioxide acts as a germicidal agent, and from .01 to .1 part of the arsenic trioxide per 100 parts of latex is the preferred range for preventing bacterial growth. Larger amounts of arsenic trioxide of course may be added but proportions in excess of .1% are deemed unnecessary. The addition of .2 to .75 part ammonia per 100 parts of latex has been found sufficient ammonia for proper preservation of latex in the presence of arsenic trioxide. Other bases than ammonia, for example, fixed alkalies, such as sodium and potassium hydroxides, and water soluble organic derivatives of ammonia, for example, basic amines, such as the mono-, di- and trialkyl amines, preferably in amounts ranging from .2 to .5%, may be used in conjunction with the arsenic trioxide which, as in the case of its use with ammonia as described above, is preferably present in amounts ranging from .01 to .1%. The combination of arsenic trioxide and base may be used to preserve fresh latex as it comes from the trees for shipment to various countries. The combination may also be used to preserve a latex that has already been exported from plantation countries with another type of preservative after freeing such latex from its original preservative. The arsenic trioxide may be added to the latex by suspension in water or by solution in ammonia or other base. It is obvious that the basic salts of arsenic trioxide are as useful in the present invention as the arsenic trioxide itself, and the expression "arsenic trioxide" in the description and claims is intended to include the basic salts of arsenic trioxide as well as the free arsenic trioxide itself.

With the present embodiment in mind and without intending to limit the invention beyond what may be required by the prior art, the following specific examples may be given:

Example I

To latex as it came from the tree was added .2 part of ammonia per 100 parts of the latex. To a portion of this latex was added .01% arsenic trioxide; to another portion was added .1% arsenic trioxide. Some of the latex containing the .2% ammonia was allowed to stand without further addition. The latex containing the .2% ammonia but without the arsenic trioxide coagulated in three days. The latices containing the .2% ammonia and .01 and .1% arsenic trioxide, respectively, were stable and had a good odor after forty days. The latex containing .2% ammonia and .1% arsenic trioxide was shipped to the United States from Sumatra and arrived after three months in good condition.

Example II

To fresh latex was added .75 part of ammonia to 100 parts of latex. To a portion of the latex thus treated with .75% ammonia was added .1 part of arsenic trioxide per 100 parts of the latex. A portion of the latex containing .75% ammonia was set aside without any further addition of other material. After standing 145 days, the pH of the latex containing only the ammonia was 9.1, while the pH of the latex containing both the ammonia and arsenic trioxide was 9.8. The latex to which the ammonia alone had been added had a bad odor, while the latex containing both the ammonia and arsenic trioxide had no off-odor. The stability of the latex containing both the ammonia and arsenic trioxide was much higher than the latex containing the ammonia alone.

Example III

Latex which had been shipped from the plantations with 1.25% ammonia as the preservative was substantially freed from ammonia by blowing air through it. To a portion of the thus treated latex was added .05 part of arsenic trioxide and .4 part of ammonia per 100 parts of latex. To another portion was added only the .4 part of ammonia per 100 parts of latex. The blown latex thus treated with ammonia alone developed an off-odor and became coagulated in several weeks, while the blown latex re-preserved with the arsenic trioxide and ammonia was in good condition and had no off-odor at the end of 200 days.

*Example IV*

Latex as it came from the tree was preserved with .5% potassium hydroxide and .1% arsenic trioxide. A similar sample was set aside containing only the potassium hydroxide. The sample without the arsenic trioxide became putrid in five days and coagulated after seven days. The sample containing both the arsenic trioxide and potassium hydroxide was still good, free from odor, and uncoagulated after 130 days.

It is thus seen that the use of small amounts of arsenic trioxide in latex preservation processes permits a reduction in the amount of ammonia over that used where the ammonia is the sole preservative. The ammonia may also satisfactorily be replaced by other bases which impart the desired alkalinity to the latex in the presence of the arsenic trioxide.

With the detailed disclosure above given, it is obvious that modifications will suggest themselves and it is not desired to limit the invention otherwise than as set forth in the appended claims.

Having thus described our invention, what we claim and desire to protect by Letters Patent is:

1. Latex containing a small amount of arsenic trioxide and .2 to .75% ammonia, the amount of ammonia being insufficient of itself to preserve the latex.

2. Latex containing .01 to .1% arsenic trioxide and a small amount of a base, the amount of base being insufficient of itself to preserve the latex.

3. Latex containing .01 to .1% arsenic trioxide and .2 to .75% ammonia, the amount of ammonia being insufficient of itself to preserve the latex.

4. The method of preserving latex which comprises adding to latex .01 to .1 part arsenic trioxide per 100 parts of latex and a small amount of a base, the amount of base being insufficient of itself to preserve the latex.

5. The method of preserving latex which comprises adding to latex .01 to .1 part arsenic trioxide and .2 to .75 part ammonia per 100 parts of latex, the amount of ammonia being insufficient of itself to preserve the latex.

6. The method of preserving latex which comprises adding to latex a small amount of arsenic trioxide and .2 to .75 part ammonia per 100 parts of latex, the amount of ammonia being insufficient of itself to preserve the latex.

WALLACE ELLWOOD CAKE.
EUGENE MILLER McCOLM.